US011010629B2

(12) United States Patent
Feng et al.

(10) Patent No.: US 11,010,629 B2
(45) Date of Patent: May 18, 2021

(54) METHOD FOR AUTOMATICALLY EXTRACTING IMAGE FEATURES OF ELECTRICAL IMAGING WELL LOGGING, COMPUTER EQUIPMENT AND NON-TRANSITORY COMPUTER READABLE MEDIUM

(71) Applicant: PetroChina Company Limited, Beijing (CN)

(72) Inventors: Zhou Feng, Beijing (CN); Ning Li, Beijing (CN); Hongliang Wu, Beijing (CN); Kewen Wang, Beijing (CN); Peng Liu, Beijing (CN); Yusheng Li, Beijing (CN); Huafeng Wang, Beijing (CN); Chen Wang, Beijing (CN)

(73) Assignee: PetroChina Company Limited, Beijing (CN)

( * ) Notice: Subject to any disclaimer, the term of this patent is extended or adjusted under 35 U.S.C. 154(b) by 26 days.

(21) Appl. No.: 16/507,270

(22) Filed: Jul. 10, 2019

(65) Prior Publication Data

US 2020/0065606 A1 Feb. 27, 2020

(30) Foreign Application Priority Data

Aug. 24, 2018 (CN) .......................... 201810971762.4

(51) Int. Cl.
*G06K 9/46* (2006.01)
*G06T 5/30* (2006.01)
(Continued)

(52) U.S. Cl.
CPC ................. *G06K 9/46* (2013.01); *G06N 3/08* (2013.01); *G06N 20/00* (2019.01); *G06T 5/30* (2013.01);
(Continued)

(58) Field of Classification Search
None
See application file for complete search history.

(56) References Cited

U.S. PATENT DOCUMENTS 6,011,557 A * 1/2000 Keskes ..................... G01V 1/34
345/582
6,266,618 B1 * 7/2001 Ye ............................. G01V 3/38
702/10
(Continued)

FOREIGN PATENT DOCUMENTS

CN 1687806 A 10/2005
CN 101802649 A 8/2010
(Continued)

OTHER PUBLICATIONS

First Office Action and Search Report dated May 21, 2020 for Chinese Application No. 201810971762.4.
(Continued)

*Primary Examiner* — Tahmina N Ansari
(74) *Attorney, Agent, or Firm* — Young Basile Hanlon & MacFarlane, P.C.

(57) ABSTRACT

A method and an apparatus for automatically extracting image features of electrical imaging well logging, wherein the method comprises the steps of: acquiring historical data of electrical imaging well logging; pre-processing the historical data of the electrical imaging well logging to generate an electrical imaging well logging image covering a full hole; recognizing and marking a typical geological feature in the electrical imaging well logging image covering the full hole, obtaining a processed image, and determining the processed image as a training sample according to types of the geological features; constructing a deep learning model including an input layer, a plurality of hidden layers, and an output layer; training the deep learning model using the training sample; using the trained deep learning model,
(Continued)

recognizing type of a geological feature of an electrical imaging well logging image of a well section to be recognized, and performing morphological optimization processing on the recognition result to obtain a feature optimization recognition result. The solution can automatically, quickly and accurately recognize the typical geological features in the electrical imaging well logging image.

15 Claims, 6 Drawing Sheets

(51) Int. Cl.
  *G06N 20/00* (2019.01)
  *G06N 3/08* (2006.01)
  *G06T 7/00* (2017.01)
(52) U.S. Cl.
  CPC .. *G06T 7/0002* (2013.01); *G06T 2207/20081* (2013.01); *G06T 2207/20084* (2013.01); *G06T 2207/30181* (2013.01)

(56) References Cited

U.S. PATENT DOCUMENTS

| | | | | |
|---|---|---|---|---|
| 2016/0307312 | A1* | 10/2016 | Sungkorn | G06T 7/0004 |
| 2020/0065606 | A1* | 2/2020 | Feng | G06T 7/0002 |
| 2020/0065620 | A1* | 2/2020 | Feng | G01V 3/38 |

FOREIGN PATENT DOCUMENTS

| | | |
|---|---|---|
| CN | 101899971 A | 12/2010 |
| CN | 104732562 A | 6/2015 |
| CN | 105551018 A | 5/2016 |
| CN | 106202997 A | 12/2016 |
| CN | 106323836 A | 1/2017 |
| CN | 106443802 A | 2/2017 |
| CN | 106526693 A | 3/2017 |
| CN | 106529534 A | 3/2017 |
| CN | 106610508 A | 5/2017 |
| CN | 106909924 A | 6/2017 |
| CN | 107356958 A | 11/2017 |
| CN | 107680090 A | 2/2018 |
| CN | 107797154 A | 3/2018 |
| EP | 0561492 A2 | 9/1993 |
| WO | 03/052669 A1 | 6/2003 |

OTHER PUBLICATIONS

Duan You-xiang, et al., "Research on convolutional neural network for reservoir parameter prediction", Journal on Communications, vol. 37, No. Z1, Oct. 2016.

Liu Ruilin, et al., "Extracting fracture-vug plane porosity from electrical imaging logging data using dissection of wavelet-transform-based image," Chinese Journal of Geophysics, vol. 60, No. 12, pp. 4945-4955, Dec. 2017.

Zhao Jun, et al., "The object picking and calculating by image devision for the image log data", Progress in Geophysics, vol. 22, No. 5, pp. 1502-1509, Oct. 2007.

Zou Changchun et al., Geophysical Well Logging, Geological Publishing House, pp. 130-134, Dec. 31, 2010.

Wu Zhengyang et al., Convolutional neural network algorithm for classification evaluation of fractured reservoirs, Geophysical Prospecting for Petroleum, vol. 57, No. 4, pp. 618-626, Jul. 31, 2018.

Chinese Search Report dated Aug. 20, 2018 for CN Application No. 201810971762.4.

Application progress of cluster analysis in Geophysics, China Science and Technology Information , 2008, No. 15.

Study on logging sedimentary microfacies and reservoir physical parameters of xiagou formation of lower cretaceous in qingxi oilfield, Chinese Dissertations Theses Full-Text Databases.

The Comprehensive Research on Carboniferous Volcanic Rock Reservoir of Zhongguai uplift in Northwestern Margin of Junggar Basin,Chinese Dissertations Theses Full-Text Databases.

Potentially Related, U.S. Appl. No. 16/506,891, filed Jul. 9, 2019.

Imamverdiyev et al., "Lithological facies classification using deep convolutional neural network", Journal of Petroleum Science and Engineering 175, pp. 216-228 (2019).

Combined Search and Examination Report dated Nov. 13, 2019 for counterpart UK patent application No. 1906560.6.

* cited by examiner

METHOD FOR AUTOMATICALLY EXTRACTING IMAGE FEATURES OF ELECTRICAL IMAGING WELL LOGGING, COMPUTER EQUIPMENT AND NON-TRANSITORY COMPUTER READABLE MEDIUM

TECHNICAL FIELD

The invention relates to the technical field of data processing and interpretation of electrical imaging well logging, and in particular to a method for automatically extracting image features of electrical imaging well logging, computer equipment and non-transitory computer-readable medium.

BACKGROUND

Electrical imaging well logging is the most widely used imaging well logging method at present, through which images can visually display stratum deposition and structural features such as mud, crumbs, calcite crystals, pores, fractures, bedding and faults, folds and the like, and provides an important basis for reservoir comprehensive analysis. The traditional electrical imaging well logging image interpretation is mainly that an expert performs qualitative discrimination directly on all kinds of features based on the experience, which highly depends on the expert experience, has a strong interpretation subjectivity, and is difficult to meet the urgent need of oil field exploration and production. How to accurately recognize, classify and quantitatively extract all kinds of geological features on electrical imaging well logging images is the key to realize automatic and intelligent processing of electrical imaging well logging data.

In the prior art, automatic recognition and extraction of electrical imaging well logging image features are carried out by performing binarization processing on the electrical imaging well logging images by an image segmentation algorithm to separate feature regions and then calculate feature parameters such as color, shape, texture and the like of the feature regions, and finally classify and extract the features by methods such as fuzzy mathematics, neural network and the like. Although such methods achieves certain effects in practical application, they still have the following problems: 1) the feature extraction effect is controlled by image segmentation quality, because of the complexity of the actual geological situation, in continuous processing in a long well section, it is difficult to achieve accurate separation of image features, which causes loss or misjudgment of feature extraction; 2) classification methods based on the statistics of the feature parameters are influenced by the selected parameter indexes, so that the recognition accuracy is limited, and the classification methods are usually related to geological conditions of specific regions, and thus the universality is poor; 3) in the prior art, generally only specific geological feature targets such as fracture and caves are recognized and extracted, which cannot meet differentiation and diversity needs of geological research and reservoir evaluation.

SUMMARY

Embodiments of the invention provide a method for automatically extracting image features of electrical imaging well logging, computer equipment and non-transitory computer-readable medium, which can automatically, rapidly and accurately recognize typical geological features in the electrical imaging well logging images, meanwhile, the statistical feature parameters are consistent with reservoir physical properties and test results, thereby providing an important technical support for oil and gas field exploration and development.

The method for automatically extracting image features of electrical imaging well logging comprises:

acquiring historical data of electrical imaging well logging;

pre-processing the historical data of the electrical imaging well logging to generate an electrical imaging well logging image covering a full hole;

recognizing and marking a typical geological feature in the electrical imaging well logging image covering the full hole, obtaining a processed image, and determining the processed image as a training sample according to types of the geological features;

constructing a deep learning model including an input layer, a plurality of hidden layers, and an output layer;

training the deep learning model using the training sample to obtain a trained deep learning model;

using the trained deep learning model, recognizing type of a geological feature of an electrical imaging well logging image of a well section to be recognized to obtain a recognition result; and performing morphological optimization processing on the recognition result to obtain a feature optimization recognition result.

Embodiments of the invention also provide a computer device comprising a memory, a processor and a computer program stored on the memory and executable on the processor, when executing the computer program, the processor implementing the following method of:

acquiring historical data of electrical imaging well logging;

pre-processing the historical data of the electrical imaging well logging to generate an electrical imaging well logging image covering a full hole;

recognizing and marking a typical geological feature in the electrical imaging well logging image covering the full hole, obtaining a processed image, and determining the processed image as a training sample according to types of the geological features;

constructing a deep learning model including an input layer, a plurality of hidden layers, and an output layer;

training the deep learning model using the training sample to obtain a trained deep learning model;

using the trained deep learning model, recognizing type of a geological feature of an electrical imaging well logging image of a well section to be recognized to obtain a recognition result; and performing morphological optimization processing on the recognition result to obtain a feature optimization recognition result.

Embodiments of the present invention also provide a non-transitory computer-readable medium which stores a computer program for executing the following method of:

acquiring historical data of electrical imaging well logging;

pre-processing the historical data of the electrical imaging well logging to generate an electrical imaging well logging image covering a full hole;

recognizing and marking a typical geological feature in the electrical imaging well logging image covering the full hole, obtaining a processed image, and determining the processed image as a training sample according to types of the geological features;

constructing a deep learning model including an input layer, a plurality of hidden layers, and an output layer;

training the deep learning model using the training sample to obtain a trained deep learning model;

using the trained deep learning model, recognizing type of a geological feature of an electrical imaging well logging image of a well section to be recognized to obtain a recognition result; and performing morphological optimization processing on the recognition result to obtain a feature optimization recognition result.

In embodiments of the invention, the electrical imaging well logging images are learned and predicted by a deep learning method, which can accurately recognize and analyze low-level local features and high-level abstract structural features of the electrical imaging well logging images, can automatically, rapidly and accurately recognize typical geological features in the electrical imaging well logging images, and has very good recognition accuracy.

BRIEF DESCRIPTION OF THE DRAWINGS

In order to more clearly explain embodiments of the invention or the technical solution in the prior art, drawings that need to be used in the description in embodiments or the prior art will be simply introduced below, obviously the drawings in the following description are merely some examples of the invention, for persons ordinarily skilled in the art, it is also possible to obtain other drawings according to these drawings without making creative efforts.

DETAINED DESCRIPTION OF EMBODIMENTS

Hereinafter the technical solution in embodiments of the present invention will be described clearly and integrally in combination with the accompanying drawings in embodiments of the present invention, and obviously the described embodiments are merely part of embodiments, not all of embodiments. Based on embodiments of the present invention, all other embodiments that are obtained by persons skilled in the art without making creative efforts fall within the protection scope of the present invention.

Figure 1:
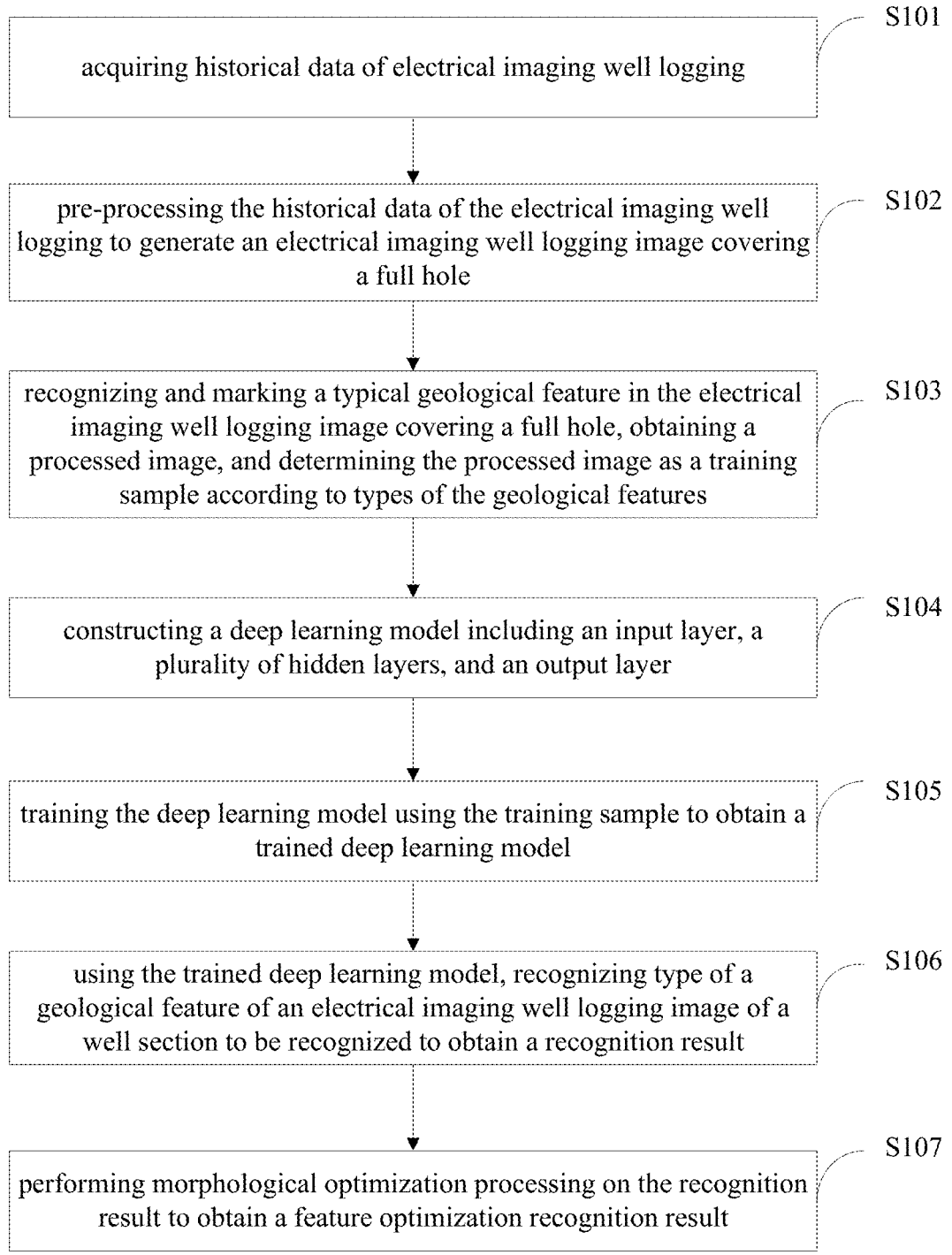
FIG. 1 is a flow chart (I) of a method for automatically extracting image features of electrical imaging well logging provided by embodiments of the invention.

In embodiments of the invention, there is provided a method for automatically extracting image features of electrical imaging well logging, as shown in FIG. 1, the method comprising:

S101: acquiring historical data of electrical imaging well logging;

S102: pre-processing the historical data of the electrical imaging well logging to generate an electrical imaging well logging image covering a full hole;

S103: a training sample determination module, for recognizing and marking a typical geological feature in the electrical imaging well logging image covering the full hole, obtaining a processed image, and determining the processed image as a training sample according to types of the geological features;

S104: constructing a deep learning model including an input layer, a plurality of hidden layers, and an output layer;

S105: training the deep learning model using the training sample to obtain a trained deep learning model;

S106: using the trained deep learning model, recognizing type of a geological feature of an electrical imaging well logging image of a well section to be recognized to obtain a recognition result; and S107: performing morphological optimization processing on the recognition result to obtain a feature optimization recognition result.

In embodiments of the invention, the step S101 includes collecting and sorting electrical imaging well logging data of a research area, and which may also include related data such as other conventional well logging data, geological data and core description and the like, so as to make a comprehensive understanding of the imaging well logging image display features of typical geological phenomena.

In embodiments of the invention, in the step S102, an original electrical imaging well logging image can be obtained after acceleration correction, equalization and other pre-processing are performed on the collected and sorted electrical imaging well logging data by an electrical imaging well logging processing system on a CIF Log well logging software platform, and resistivity scale processing is performed on the original electrical imaging well logging image to obtain a scale image reflecting resistivity of rocks of borehole wall formation.

At present, the electrical imaging well logging is measured by means of pole plate sticking to borehole wall and can not completely cover the full hole (usually the coverage can only reach 60% to 80%). Then a full hole image of the scale image reflecting resistivity of rocks of borehole wall formation is generated, and specifically, a full hole image processing method is adopted to perform probabilistic interpolation processing on the uncovered portion of the scale image, to obtain an electrical imaging well logging image covering the full hole. The full hole image processing can effectively make up a blank part in the original image, and the image features are completer and more intuitive, which lays the foundation for the automatic recognition and extraction of later image features, and improves the automatic recognition effect of the imaging well logging facies.

In an embodiment of the present invention, in the step S103, the type of the geological feature to be extracted is determined according to the needs of the study. Specifically, a well logging expert browses a full hole imaging well logging image obtained in the step S102 and classifies and marks typical geological features. Taking effective reservoir evaluation and sedimentary facies study of Lower Majiagou formation of Ordovician in Jingbian area, Changqing Oilfield as an example, the characteristic geological phenomena most concerned in the imaging well logging images include seven types: a dissolved pore, a gravel, a mudgrain layer, a mud strip, a mud thickness layer, fractures, and induced cracks.

Figure 2:
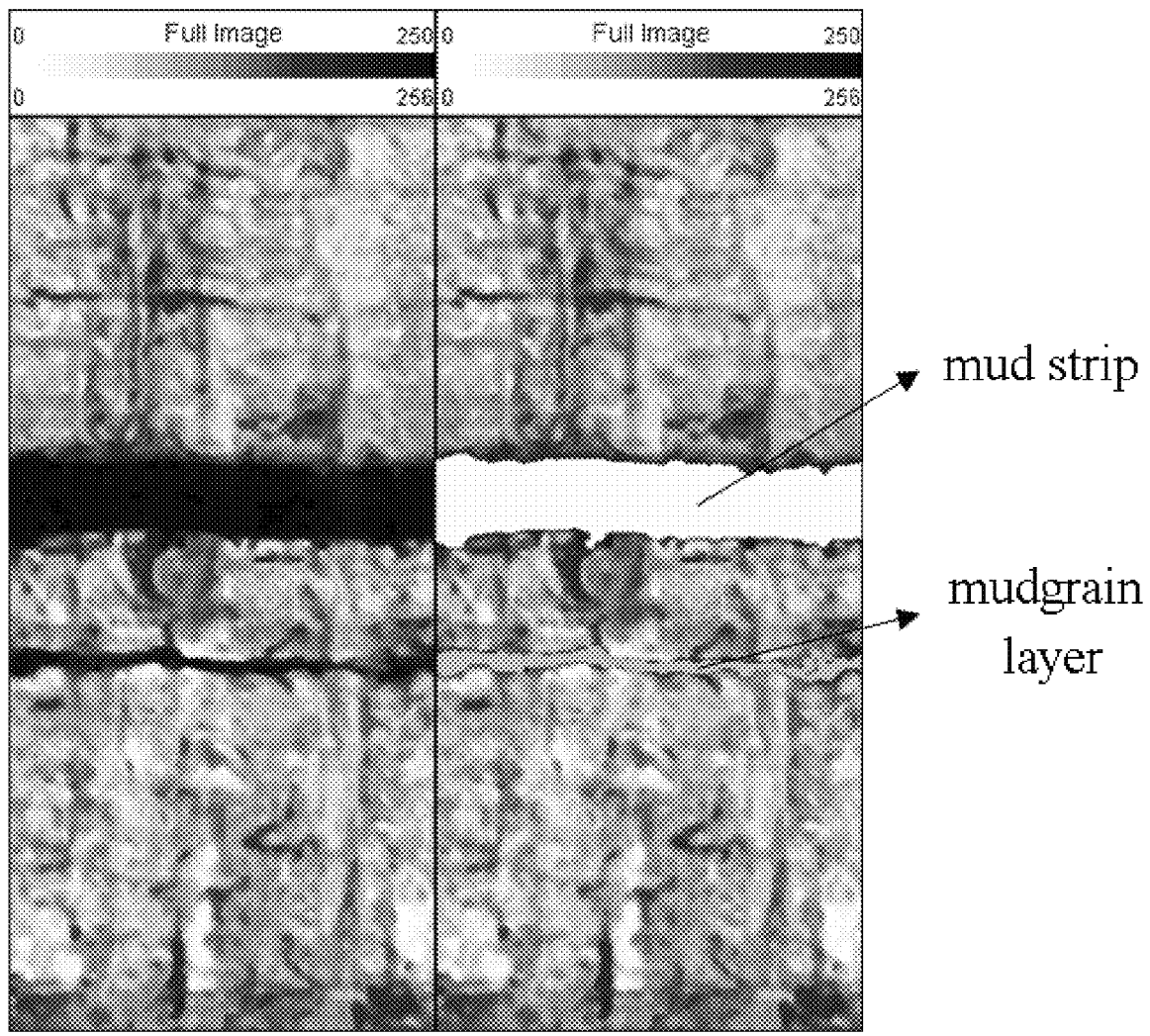
FIG. 2 is a schematic diagram of an image feature mark of a certain well section provided by embodiments of the invention.

FIG. 2 is a schematic diagram illustrating an image feature mark of a certain well section. It can be seen from FIG. 2 that the main geological feature phenomenon of the well section image includes a mudgrain layer and a mud strip, and accurate regions of these two types of features are respectively marked, each image feature is save as two pictures, one of which records a position of the accurate region of the feature and its category, the image is used as a label image for subsequent deep learning, and the other of which is a full hole image of electrical imaging well logging of a depth section corresponding to the feature (the feature points are taken as 0.5 m above and below, and the total depth range is 1 m).

For each type of geological features, samples should be marked as much as possible (not less than 100), and the marked samples should cover possible patterns of such features in the study area as far as possible. In an embodiment, by recognizing and classifying and marking the image well logging images of more than 120 typical wells in Changqing oil field, Tarim oil field, Southwest oil and gas field and other oil fields, totally 8733 samples of seven types of features including a dissolved pore, a gravel, a mudgrain layer, a mud strip, a mud thickness layer, fractures, and induced cracks are established, as a set of samples for subsequent deep learning model training. Using a script file that comes with the caffe framework, leveldb data are generated of the imaging well logging images and the label images of all categories of geological features in the set of samples.

In an embodiment of the invention, in the step S104, a deep learning model is constructed according to the needs of the study, the deep learning model may include an N layer structure, and specific numerical value of the N is determined according to the needs of the study. In the present invention, an optimum N, i.e. 12, is obtained after study. That is, the deep learning model includes a 12-layer structure in which a first layer is an input layer, second to eleventh layers are hidden layers, and a twelfth layer is an output layer, and each layer structure is as follows:

the first layer is an input layer;

the second layer is a hidden layer, including a convolution layer, an activation function layer, a convolution layer, an activation layer, and a pooling layer;

the third layer is a hidden layer, including a convolution layer, an activation function layer, a convolution layer, an activation layer, and a pooling layer;

the fourth layer is a hidden layer, including a convolution layer, an activation function layer, a convolution layer, an activation layer, a convolution layer, an activation layer, and a pooling layer;

the fifth layer is a hidden layer, including a convolution layer, an activation function layer, a convolution layer, an activation layer, a convolution layer, an activation layer, and a pooling layer;

the sixth layer is a hidden layer, including a convolution layer, an activation function layer, a convolution layer, an activation layer, a convolution layer, an activation layer, and a pooling layer;

the seventh layer is a hidden layer, including a full convolution layer, an activation function layer, and a Dropooout layer;

the eighth layer is a hidden layer, including a full convolution layer, an activation function layer, and a Dropoout layer;

the ninth layer is a hidden layer, including a deconvolution layer, a Crop layer, and an Eltwise layer;

the tenth layer is a hidden layer, including a deconvolution layer, a Crop layer, and an Eltwise layer;

the eleventh layer is a hidden layer, including a deconvolution layer and a Crop layer; and the twelfth layer is an output layer, including a softmax layer.

Specifically, the first layer is an input layer, in which the full hole image data and the corresponding label image in a training set obtained in the step S103 are input in the LevelDB data format, and the batch size is set to 2, wherein setting of the batch size is related to a video memory of a computer, and different setting values of a video card size and a video memory size may vary.

The second layer is a hidden layer, including a convolution layer, an activation function layer, a convolution layer, an activation layer, and a pooling layer, wherein the convolution layer has totally 64 neurons, size of a convolution kernel is 3*3, the step size is set to 1, the edge extended value Padding is set to 100. The input data size is [2,3,H0, W0], where 2 is the batch size, 3 is the number of image color channels, and H0, W0 are height and width of the input image respectively. The size of the output data after convolution operation is [2,64,H1,W1], where 2 is the batch size, 64 is number of the channels (after passing through 64 neurons, 64 channel feature maps are generated), H1 is height of the feature maps, W1 is width of the feature maps, and H1, W1 can be calculated by the following formula:

$$H_1 = \frac{H_0 + 2 \times \text{Padding} - Cks}{S} + 1;$$

$$W_1 = \frac{W_0 + 2 \times \text{Padding} - Cks}{S} + 1;$$

wherein $H_0$, $W_0$ are height and width of the input image, respectively; $H_1$, $W_1$ are height and width of the output feature image of the convolution layer, respectively; Padding is the size of the edge extended value; Cks is the size of the convolution kernel; S is the step size.

The feature map obtained by the convolution layer is then processed by the activation layer, wherein a Relu function is selected as the activation function, and the calculation formula is max(0,x). The Relu function can reduce calculation amount of an error gradient in backpropagation, and meanwhile can increase sparse lines of the network, reduce interdependence of the parameters, and alleviate occurrence of the over-fitting problem. The activation function layer does not change either the size of the feature maps or the number of the feature maps.

The data then undergoes one time of operation of convolution plus activation as described above, the data size of the input image is [2,64,H1,W1], and the output data size is [2,64,H1,W1].

After the data is processed through the above two layers, the data passes through the pooling layer, i.e., a down-sampling layer, in which maximum pool operation without overlapping is performed on the picture. The size of a pool window is set to 2*2, and the step size is set to 2. The pooling operation does not change the number of feature maps, and the final data size is [2,64,H½,W½].

The third layer is a hidden layer, including a convolution layer, an activation function layer, a convolution layer, an activation layer, and a pooling layer, wherein the convolution layer has totally 128 neurons, size of a convolution kernel is 3*3, the step size is set to 1, the edge extended value Padding is 1. The data with the size of [2,128,H½, $W\frac{1}{2}$] is output, after convolution processing. The output feature map is processed by a nonlinear activation function, i.e., the Relu function.

The data then undergoes one time of operation of convolution plus activation as described above, the data size of the input image is $[2,128,H\frac{1}{2},W\frac{1}{2}]$, and the output data size is $[2,128,H\frac{1}{2},W\frac{1}{2}]$.

After the data is processed through the above two layers, the data passes through the pooling layer, i.e., a down-sampling layer. The size of a pooling window is 2*2, and the pooling step size is 2. Maximum pooling without overlapping is performed on the picture, to finally output data with the size of $[2,128,H\frac{1}{4},W\frac{1}{4}]$.

The fourth layer is a hidden layer, including a convolution layer, an activation function layer, a convolution layer, an activation layer, a convolution layer, an activation layer, and a pooling layer, wherein the convolution layer has totally 256 neurons, size of a convolution kernel is 3*3, the step size is set to 1, the edge extended value Padding is 1. The data with the size of $[2,256,H\frac{1}{4},W\frac{1}{4}]$ is output after convolution processing. The output feature map is processed by a nonlinear activation function, i.e., the Relu function.

The data then undergoes operation of convolution plus activation as described above twice, the data size of the input image is $[2,256,H\frac{1}{4},W\frac{1}{4}]$, and the output data size is $[2,256,H\frac{1}{4},W\frac{1}{4}]$.

After the data is processed as above, the data passes through the pooling layer, i.e., a down-sampling layer. The size of a pooling window is 2*2, and the pooling step size is 2. Maximum pooling without overlapping is performed on the picture, to finally output data with the size of $[2,256,H\frac{1}{8},W\frac{1}{8}]$.

The fifth layer is a hidden layer, including a convolution layer, an activation function layer, a convolution layer, an activation layer, a convolution layer, an activation layer, and a pooling layer, wherein the convolution layer has totally 512 neurons, size of a convolution kernel is 3*3, the step size is set to 1, the edge extended value Padding is 1. The data with the size of $[2,512,H\frac{1}{8},W\frac{1}{8}]$ is output after convolution processing. The output feature map is processed by a nonlinear activation function, i.e., the Relu function. The data then undergoes operation of convolution plus activation as described above twice, the data size of the input image is $[2,256,H\frac{1}{8},W\frac{1}{8}]$, and the output data size is $[2,512,H\frac{1}{8},W\frac{1}{8}]$.

After the data is processed as above, the data passes through the pooling layer, i.e., a down-sampling layer. The size of a pooling window is 2*2, and the pooling step size is 2. Maximum pooling without overlapping is performed on the picture, to finally output an image having the data size of $[2,512,H\frac{1}{16},W\frac{1}{16}]$.

The sixth layer is a hidden layer, including a convolution layer, an activation function layer, a convolution layer, an activation layer, a convolution layer, an activation layer, and a pooling layer, wherein the convolution layer has totally 512 neurons, size of a convolution kernel is 3*3, the step size is set to 1, the edge extended value Padding is 1. After undergoing the convolution processing, the input data is then processed by the Relu activation function. The data then undergoes the operation of convolution plus activation as described above twice. After the data is processed as above, the data passes through the pooling layer, i.e., a down-sampling layer. The size of a pooling window is 2*2, and the pooling step size is 2. Maximum pooling without overlapping is performed on the picture, to finally output data with the size of $[2,512,H\frac{1}{32},W\frac{1}{32}]$.

The seventh layer is a hidden layer, including a full convolution layer, an activation function layer, and a Dropooout layer. The convolution layer has totally 4096 neurons, the convolution kernel size is 7*7, the step size is set to 1, and the edge extended value Padding is 0. After undergoing the convolution processing, the input data is then processed by the Relu activation function, and finally passes through the Dropout layer. The probability of dropping data is set to be 0.5. The Dropout layer is set mainly for preventing occurrence of over-fitting phenomenon. In the Dropout layer, the input data size is $[2,4096,H\frac{1}{32},W\frac{1}{32}]$, and the output data size is $[2,4096,H\frac{1}{32},W\frac{1}{32}]$.

The eighth layer is a hidden layer, including a full convolution layer, an activation function layer, and a Dropooout layer; the convolution layer has totally 4096 neurons, the convolution kernel size is 1*1, the step size is set to 1, and the edge extended value is 0. After undergoing the convolution processing, the input data is then processed by the Relu activation function, and finally passes through the Dropout layer. The probability of dropping data is set to be 0.5. In the Dropout layer, the input data size is $[2,4096, H\frac{1}{32},W\frac{1}{32}]$, and the output data size is $[2,4096,H\frac{1}{32},W\frac{1}{32}]$.

The ninth layer is a hidden layer, including a deconvolution layer, a convolution layer, a Crop layer, and an Eltwise layer. The deconvolution layer up-samples the output image of the eighth layer by four times to obtain an output data with the size of $[2,33,H\frac{1}{8},W\frac{1}{8}]$. The convolution layer convolves the output image of the fifth layer, the number of neurons in the convolution layer is the number of categories of the features o be recognized, here 7 neurons are set, the convolution kernel size is 1*1, the step size is set to 1, and the edge extended value is 1, to obtain an output data size of $[2,7,H\frac{1}{16},W\frac{1}{16}]$. In the Crop layer, number of axis is set to 2, offset to 5. The resulting output data size is $[2,7,H\frac{1}{16},W\frac{1}{16}]$, and finally passes through the Eltwise layer to ultimately generate the output data with the size of $[2,7,H\frac{1}{16},W\frac{1}{16}]$.

The tenth layer is a hidden layer, including a deconvolution layer, a convolution layer, a Crop layer, and an Eltwise layer. The deconvolution layer up-samples the output image of the ninth layer by two times to obtain an output data with the size of $[2,7,H\frac{1}{8},W\frac{1}{8}]$. The convolution layer convolves the output of the fourth layer, the number of neurons in the convolution layer is the number of categories of the features o be recognized, here 7 neurons are set, the convolution kernel size is 1*1, the step size is set to 1, and the edge extended value is 1, to obtain an output data size of $[2,7,H\frac{1}{8},W\frac{1}{8}]$. In the Crop layer, number of axis is set to 2, offset to 9. The resulting output image data with the size of $[2,7, H\frac{1}{8},W\frac{1}{8}]$, and finally passes through the Eltwise layer to ultimately generate the output image data with the size of $[2,7, H\frac{1}{8},W\frac{1}{8}]$.

The eleventh layer is a hidden layer, including a deconvolution layer and a Crop layer. The deconvolution layer up-samples the output image of the tenth layer by eight times to obtain an output image data with the size of $[2,7,H1,W1]$. In the Crop layer, number of axis is set to 2, offset to 31. The final output is $[2,7,H1,W1]$.

The twelfth layer is an output layer, including a softmax layer. The category of each pixel point in the original image is predicted, and a result of feature recognition is obtained.

In the hidden layer, through multiple convolution and pooling operations, the obtained image is smaller and smaller, the resolution ratio is lower and lower, and a heat map reflecting high-dimensional characteristics of the image is obtained. Then, the feature image is enlarged to the size of the original image by the up-sampling operation, and category of each pixel point is predicted in the output layer to obtain a feature recognition result.

In an embodiment of the invention, in the step S105, the deep learning model established in the step S104 is trained using the training samples of the obtained various imaging well logging facies marked in the step S103. In the training process, a training sample image and a corresponding label image are input in a LevelDB data format, and the predicted categories of the trained images are output. For difference between the predicted geological feature types of the images and real geological feature types of the samples, the parameter λ (including a weight parameter and an offset parameter) in the network, and preferably a model parameter, is adjusted by reverse gradient propagation. The specific training process includes:

1) initializing all weight and offset items in the deep learning model by a transfer learning method;

2) Neural network forward operation: based on the initialized weight parameters and offset parameters, inputting the training sample into a convolution neural network by an input unit to calculate net input and output of each unit of the hidden layer and the output layer, the output of the output layer is the predicted category of the imaging well logging facies;

Each unit of the hidden layer and the output layer has many inputs connected to the outputs of the neurons of the previous layer, each having a weight. The net input of each neuron in the hidden layer and the output layer is obtained by multiplying each input connected to the neuron by its corresponding weight and then summing; the activation function is applied to the net input of each neuron in the hidden layer or the output layer, to obtain the output of the neuron. For each neuron of the hidden layer, up to the output layer, an output value is calculated to obtain a network prediction value.

3) Neural network backward operation: calculating an error between the predicted geological feature type and the geological feature type included in the training sample, and if the error is within a preset error range, the initialized weight parameter and offset parameter are optimal model parameters, and the deep learning model based on the initialized weight parameter and offset parameter is a trained deep learning model.

If the error is not within the preset error range, the initialized weight parameter and offset parameter are iteratively optimized by a reverse gradient propagation method (continuously iterating the forward operation and the backward operation of the above process), and the iteration is ended until the error is within the preset error range. The weight parameter and the offset parameter obtained by the last iteration are optimal model parameters.

The error is calculated by a Delta learning rule, an iterative learning rate lr is involved in calculating the error, a step uniformly stepping strategy is adopted to calculate each iterative learning rate lr:

$$lr = \text{base\_lr} \times gamm^{floor\left(\frac{iter}{stepsize}\right)};$$

wherein, lr is a learning rate of each iteration; base_lr is an initial learning rate, which can be adjusted according to the size of a data set; gamma is a change rate of the learning rate; stepsize is size of the stepping; iter is number of iterative steps; floor function expresses downward rounding.

Specifically, in addition to determining that the error is within the preset error range, it is also possible to determine whether or not mean-square distance between the predicted geological feature type and the geological feature type included in the training sample is minimum, and to determine that the initialized weight parameter and offset parameter are optimal model parameters if the mean-square distance is minimum.

In an embodiment of the present invention, in the step S106, the electrical imaging well logging image of the well section to be recognized (the left-most image in FIG. 3) is subject to acceleration correction processing and equalization processing, resistivity scale processing, and a full hole image generation process (various processing described in the step S102), to generate an electrical imaging well logging image covering the full hole that is to be recognized, and then to perform depth-by-depth window processing on the image (the depth range is generally 0.25 m, at this time, the size of the image is the same as that of the training sample image), and the depth window images are input into the deep learning model trained in the step S105, and the model performs one forward operation to obtain the predicted geological feature type of the image.

In the resulting images divided based on the categories of the pixel points described above, different geological feature types are marked as corresponding label attributes, and a typical geological feature recognition result can be visually displayed through the image.

Figure 3:
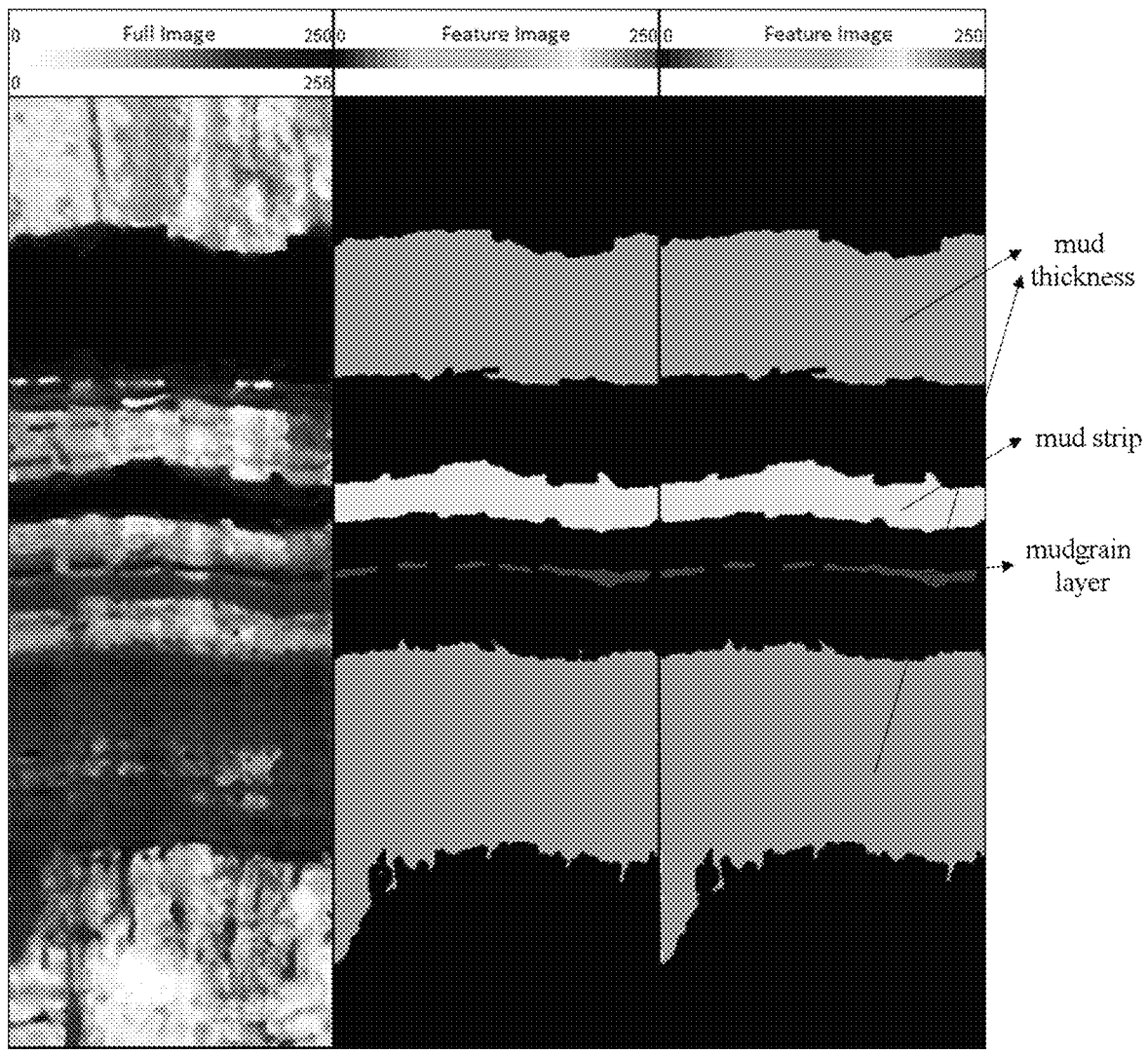
FIG. 3 is a schematic diagram of an optimization effect of feature recognition and morphology processing provided by embodiments of the invention.

The intermediate image in FIG. 3 is a schematic diagram of the recognition effect of the imaging well logging image of a certain well section. As can be seen from the figure, the method of the present invention can effectively recognize features such as a mud strip, a mudgrain layer or the like in the figure.

In an embodiment of the present invention, in the step S107, after recognizing the typical geological feature type, because of the complexity of downhole geological features and the influence of data acquisition and other similar factors, the imaging well logging image may further include some abnormal disturbance, causing the recognition effect of the feature image to be not ideal, for example, the adjacent corrosion hole features may be connected or the line-like fractures and mudgrain layer features are broken, and thus, morphological optimization processing is further needed to be performed on the recognition result.

Specifically, a morphological open operation method is adopt to process the image region where the recognition result is a corrosion hole and gravels, so as to separate the feature connection phenomenon which may be formed between adjacent features due to noise interference, and open operation takes a circular structure element with a radius of 3 pixel points.

A morphological closed operation method is adopted to process the image region where the recognition result is striation, strip and fracture, so as to connect the discontinuity of the recognition results possibly due to the weak geological features, closed operation takes a square structure element of 5*5.

In FIG. 3, the rightmost image is a schematic diagram illustrating an optimized recognition result of a mugrain layer feature of a certain well section, and it can be seen from the figure that the mudgrain layer feature is broken in the original recognition result, and the two broken features are effectively connected into a whole through morphological processing, to thereby improve the feature recognition effect and the accuracy of quantitative statistics of subsequent parameters.

Figure 4:
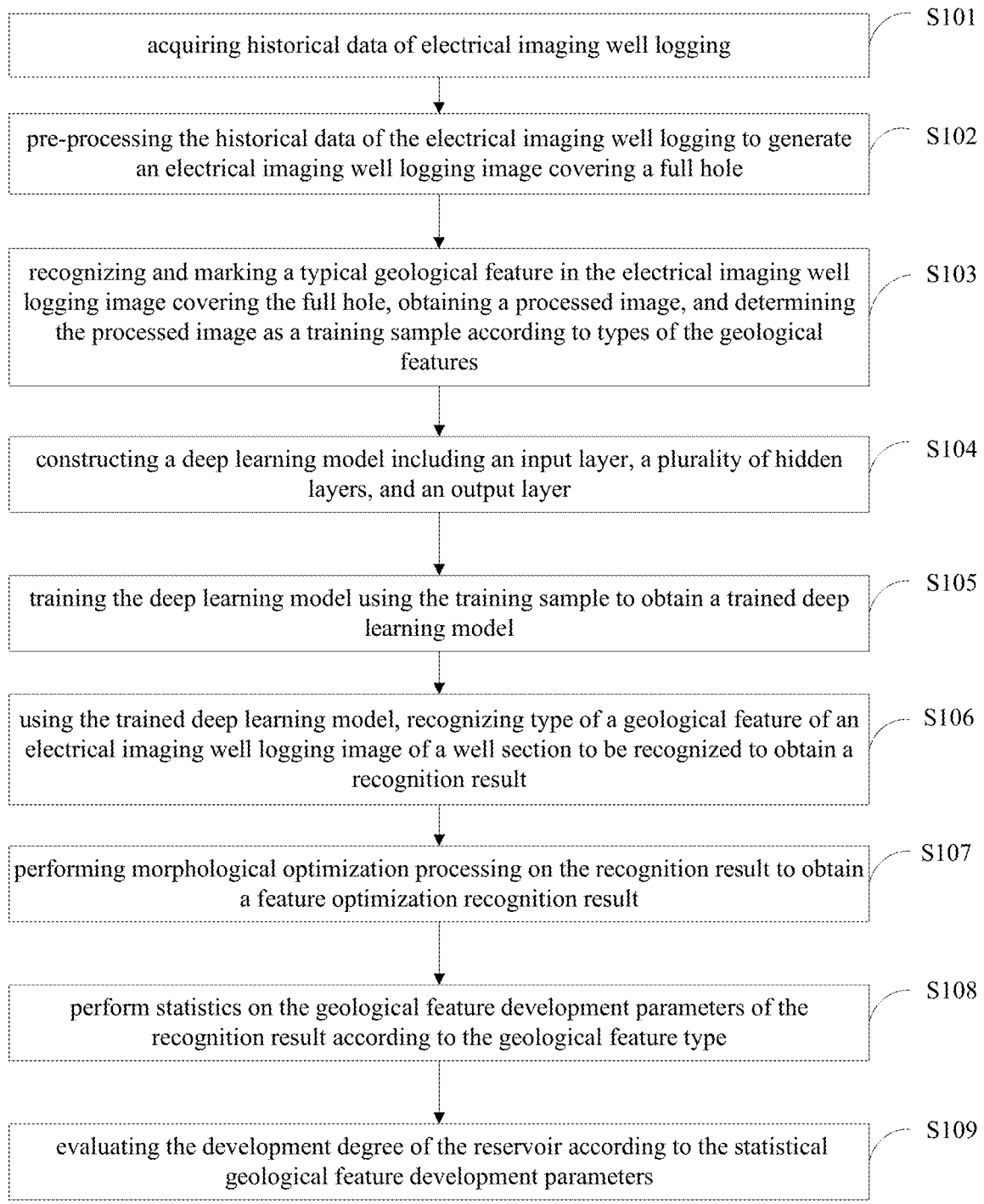
FIG. 4 is a flow chart (II) of a method for automatically extracting image features of electrical imaging well logging provided by embodiments of the invention.

In an embodiment of the present invention, as shown in FIG. 4, the method for automatically extracting image features of electrical imaging well logging further comprises:

S108: perform statistics on the geological feature development parameters of the recognition result according to the geological feature type; and S109: evaluating the development degree of the reservoir according to the statistical geological feature development parameters.

Specifically, the development of different geological features indicates the physical properties and sedimentary attributes of the reservoir, and statistics of the geological feature development parameters according to the above geological feature types may guide comprehensive evaluation of the reservoir. Alternatively, the geological feature development parameters may include one or more of a surface porosities of development of different geological features φ, grain diameters of different geological features Gs and number of development of different geological features Cn.

The quantity Cn describes the number of types of features developed within a unit depth range, and is obtained by counting and accumulating statistics of the feature classification.

The grain diameter Gs describes an average size of various features by a Feret diameter. A grain diameter of a single feature Gsi is obtained by measuring and averaging diameters of a feature object in multiple directions, the average grain diameter of the features within the unit depth range is that $Gs = \Sigma_{i=1}^{N} Gsi/N$;

The surface porosity φ describes the development degree of each feature, $\varphi = S/S_0$, wherein S is a total number of pixel points of a certain feature region, $S_0$ is a total number of pixel points of an image within the unit depth range.

Generally, for a development section of the recognized corrosion hole and fracture features, the surface porosity of the corrosion hole, the number of the corrosion hole and the number of fractures that are obtained by statistics are relatively large, which generally corresponds to a good fracture-cavity type reservoir; while for a section where features such as striation and strip are developed, the surface porosity and quantity of the striation and the strip that are obtained by statistics are relatively large, which generally corresponds to a sedimentary environment with weaker hydrodynamic force, and the reservoir is poor.

Figure 5:
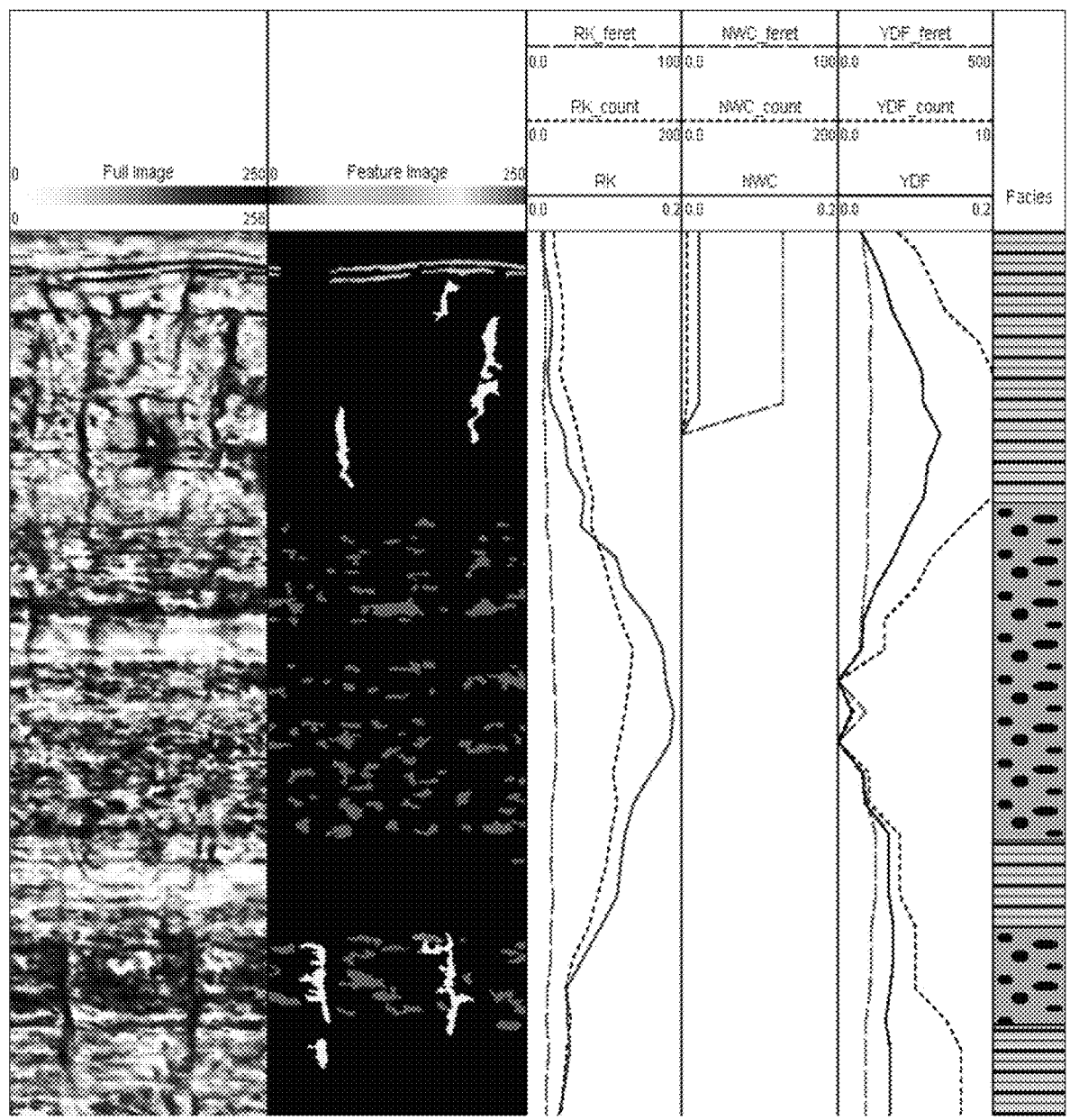
FIG. 5 is a schematic diagram of feature extraction and reservoir evaluation of an electrical imaging well logging image based on a deep learning method provided by embodiments of the invention.

On the basis of the feature automatic recognition results of the steps S106 and S107, parameters such as the developed surface porosity φ, the grain diameter Gs, the quantity Cn and the like of various geological features are counted by category. FIG. 5 is a statistical result of feature parameters of a certain well section, in which the first line is the electrical imaging well logging image of the well section to be processed, the second line is the feature recognition result, and the third to fifth lines are the statistical feature parameters of a dissolved pore, a mudgrain layer, and induced cracks. It can be seen from the figure that, according to the method of the invention, the features such as the corrosion hole, the mudgrain layer and the induced fracture can be well recognized, and quantitative statistics of the development parameters of various features is achieved. The corrosion hole in the middle of the well section is developed, which is a typical feature of granular beach sedimentary facies, is a micro-geomorphologic highland in a shallow-water sedimentary environment, is greatly affected by waves and strongly eroded in the later stage, and is a main part of high-quality reservoir development.

Embodiments of the present invention also provide a computer device, which may be a desktop computer, a tablet computer and a mobile terminal, and etc., and the present embodiment is not limited thereto. In an embodiment, the computer device can refer to implementation of the method for automatically recognizing an electrical imaging well logging facies, and the contents thereof are incorporated herein, with repetitions being not described.

Figure 6:
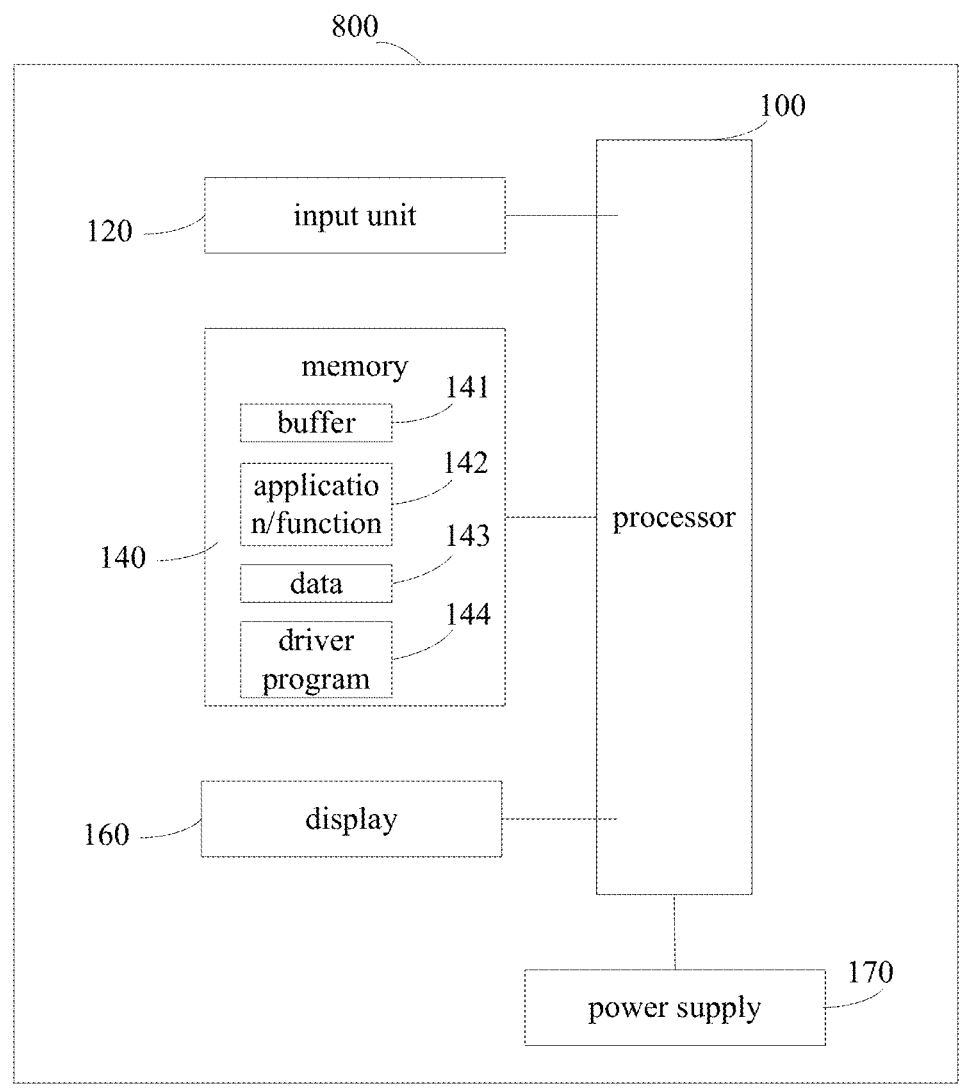
FIG. 6 is a schematic block diagram of a system composition of a computer device provided by embodiments of the invention.

FIG. 6 is a schematic block diagram of a system composition of a computer device 800 according to an embodiment of the present invention. As shown in FIG. 6, the computer device 800 may include a processor 100 and a memory 140, wherein the memory 140 is coupled to the processor 100. It is worth noting that this figure is exemplary; other types of structures may also be used in addition to or instead of the structure to implement telecommunications functions or other functions.

In one embodiment, a function of automatically extracting image features of electrical imaging well logging may be integrated into the processor 100. Wherein the processor 100 may be configured to perform control of acquiring historical data of electrical imaging well logging; pre-processing the historical data of the electrical imaging well logging to generate an electrical imaging well logging image covering a full hole; recognizing the electrical imaging well logging image covering the full hole, determining geological feature types included in the electrical imaging well logging image covering the full hole, and determining the electrical imaging well logging image covering the full hole as a training sample according to the geological feature types; constructing a deep learning model including an input layer, a plurality of hidden layers, and an output layer; training the deep learning model using the training sample to obtain a trained deep learning model; using the trained deep learning model, recognizing type of a geological feature of an electrical imaging well logging image of a well section to be recognized to obtain a recognition result.

Wherein, to generate the electrical imaging well logging image covering the full hole, the historical data of the electrical imaging well logging is pre-processed by:

performing acceleration correction processing and equalization processing on the historical data of the electrical imaging well logging to obtain an original electrical imaging well logging image;

performing resistivity scale processing on the original electrical imaging well logging image to obtain a scale image reflecting resistivity of rocks of borehole wall formation; and performing full hole image generation processing on the scale image reflecting resistivity of rocks of borehole wall formation, to generate an electrical imaging well logging image covering the full hole.

Wherein the deep learning model is constructed as follows:

the deep learning model includes a 12-layer structure in which a first layer is an input layer, second to eleventh layers are hidden layers, and a twelfth layer is an output layer;

The structure of each layer is as follows:

the first layer is an input layer;

the second layer is a hidden layer, including a convolution layer, an activation function layer, a convolution layer, an activation layer, and a pooling layer;

the third layer is a hidden layer, including a convolution layer, an activation function layer, a convolution layer, an activation layer, and a pooling layer;

the fourth layer is a hidden layer, including a convolution layer, an activation function layer, a convolution layer, an activation layer, a convolution layer, an activation layer, and a pooling layer;

the fifth layer is a hidden layer, including a convolution layer, an activation function layer, a convolution layer, an activation layer, a convolution layer, an activation layer, and a pooling layer;

the sixth layer is a hidden layer, including a convolution layer, an activation function layer, a convolution layer, an activation layer, a convolution layer, an activation layer, and a pooling layer;

the seventh layer is a hidden layer, including a full convolution layer, an activation function layer, and a Dropoout layer;

the eighth layer is a hidden layer, including a full convolution layer, an activation function layer, and a Dropoout layer;

the ninth layer is a hidden layer, including a deconvolution layer, a Crop layer, and an Eltwise layer;

the tenth layer is a hidden layer, including a deconvolution layer, a Crop layer, and an Eltwise layer;

the eleventh layer is a hidden layer, including a deconvolution layer and a Crop layer; and the twelfth layer is an output layer, including a softmax layer.

Wherein, the well logging facies of the electrical imaging well logging image of the well section to be recognized is recognized using the trained deep learning model by:

performing acceleration correction processing and equalization processing, resistivity scale processing, and a full hole image generation process on the electrical imaging well logging image of the well section to be recognized, to generate an electrical imaging well logging image covering the full hole that is to be recognized;

performing depth-by-depth window processing on the electrical imaging well logging image covering the full hole that is to be recognized, to obtain a plurality of depth window images; and inputting the plurality of depth window images into the trained deep learning model to obtain a recognition result; and further by:

performing statistics on the geological feature development parameters of the recognition result according to the geological feature type; and evaluating the development degree of the reservoir according to the statistical geological feature development parameters.

Wherein, the geological feature development parameters include one or more of a surface porosities of development of different geological features, grain diameters of different geological features and number of development of different geological features.

In another embodiment, the apparatus for automatically recognizing an electrical imaging well logging facies may be configured separately from the processor 100, for example, the apparatus for automatically recognizing the electrical imaging well logging facies may be configured as a chip connected to the processor 100, by control of which a function of automatically recognizing the electrical imaging well logging facies is realized.

As shown in FIG. 6, the computer device 800 may further include an input unit 120, a display 160, and a power supply 170. It is worth noting that the computer device 800 does not either necessarily include all of the components shown in FIG. 6; in addition, the computer device 800 may also include components not shown in FIG. 6, with reference to the prior art.

Among other things, the processor 100, sometimes referred to as a controller or an operational control, may include a microprocessor or other processor apparatuses and/or logic apparatuses, the processor 100 receives inputs and controls operation of the components of the computer device 800.

The input unit 120 provides an input to the processor 100. The input unit 120 is, for example, a key or a touch input apparatus.

The memory 140 may be, for example, one or more of a buffer, a flash memory, a hard drive, a removable medium, a volatile memory, a non-volatile memory, or other suitable apparatuses. The above-described failure-related information may be stored, and in addition, a program for executing the relevant information may be stored. And the central processor 100 may execute the program stored in the memory 140 to implement information storage or processing and the like.

The memory 140 may be a solid state memory such as read only memory (ROM), random access memory (RAM), SIM card, or the like. The memory may also be such a memory that it saves information even when power is off, on which data can be selectively erased and more data is set, and an example of which is sometimes referred to as an EPROM or the like. The memory 140 may also be some other types of apparatuses. The memory 140 includes a buffer memory 141 (sometimes referred to as a buffer). The memory 140 may include an application/function storage unit 142 for storing application programs and function programs or a flow for performing operation of an electronic device 600 by the processor 100.

The memory 140 may also include a data storage unit 143 for storing data, such as contacts, digital data, pictures, sounds, and/or any other data used by the electronic device. A driver program storage unit 144 of the memory 140 may include various driver programs of the electronic device for communication functions and/or for executing other functions of the electronic device, such as a messaging application, an address book application, and the like.

The display 160 is used for displaying objects to be displayed, such as images and text, and the like. The display may be, for example, an LCD display, but is not limited thereto.

The power supply 170 is used to provide power to the computer device 800.

Embodiments of the present invention also provide a non-transitory computer-readable medium which stores a computer program that executes the above-described method for automatically extracting image features of electrical imaging well logging. The non-transitory computer-readable medium may include physical means for storing information, and the physical means may digitizes and then stores information by a medium using electrical, magnetic or optical means. The non-transitory computer-readable medium according to the present embodiment may include an apparatus for storing information in an electric energy manner, e.g., various types of memories such as RAM, ROM, and the like; an apparatus for storing information by means of magnetic energy, such as a hard disk, a floppy disk, a magnetic tape, a magnetic core memory, a bubble memory, a USB disk; an apparatus for storing information optically, such as a CD or a DVD. Of course, there are other ways of readable storage media, such as a quantum memory, a graphene memory, and the like.

In summary, the method and the apparatus for automatically extracting image features of electrical imaging well logging provided by the present invention have the following advantages:

1) the deep learning method is introduced into electrical imaging well logging image analysis, thereby realizing accurate recognition and analysis low-level local features and high-level abstract structural features of the electrical imaging well logging images;

2) through automatic analysis, prediction and extraction of intrinsic attributes of various features by the deep learning method, the disadvantages of the prior art depending on image segmentation quality and the statistical feature parameter index type are solved, and the accuracy of feature extraction is effectively improved;

3) Automatic feature extraction based on a large number of typical geological feature samples has good universality, reduces multiplicity of solution, and meanwhile provides important reference significance for application of the deep learning method in other disciplines.

Persons skilled in the art shall understand that, embodiments of the present invention can be provided as a method, a system or a computer program product. Therefore, the present invention can adopt the forms of a full hardware example, a full software example, or combination of a software example and a hardware example. Moreover, the present invention can adopt the form of a computer program product that is implemented on one or more computer-usable storage medium (including but not limited to a disk memory, a CD-ROM, an optical memory, and etc.) including computer-usable program codes.

The invention is described with reference to flow diagrams and/or block diagrams of the method, the device (system) and the computer program product according to an embodiment of the invention. It should be understood that each flow and/or block in the flow diagrams and/or block diagrams, and the combination of the flows and/or blocks in the flow diagrams and/or block diagrams can be achieved by computer program commands. These computer program commands can be provided to a CPU of a general-purpose computer, a special-purpose computer, an embedded processor or other programmable data processing device to produce a machine, so that a device for achieving functions designated in one or more flows in the flow diagrams and/or one or more blocks in the block diagrams can be generated by the command executed by the CPU of the computer or other programmable data processing device.

These computer program commands can also be stored in a computer-readable memory that can guide a computer or other programmable data processing device to operate in a special way, so that the command stored in the computer-readable memory generates a manufactured product including a command device which achieves functions designated in one or more flows in the flow diagrams and/or one or more blocks in the block diagrams.

These computer program commands can also be loaded on a computer or other programmable data processing device, on which a series of operation steps are executed to generate processing achieved by the computer, so that the command executed on the computer or other programmable data processing device is provided for being used in the steps of achieving functions designated in one or more flows in the flow diagrams and/or one or more blocks in the block diagrams.

The foregoing is merely a preferred embodiment of the present invention and is not intended to limit the present invention, and various modifications and variations can be made to an embodiment of the present invention by those skilled in the art. Any modifications, equivalents, improvements, etc. made within the spirit and principle of the present invention are intended to be included within the protection scope of the present invention.

The invention claimed is:

1. A method for automatically extracting image features of electrical imaging well logging, wherein the method comprises:
   acquiring historical data of electrical imaging well logging;
   pre-processing the historical data of the electrical imaging well logging to generate an electrical imaging well logging image covering a full hole;
   recognizing and marking a typical geological feature in the electrical imaging well logging image covering the full hole, obtaining a processed image, and determining the processed image as a training sample according to types of the geological features;
   constructing a deep learning model including an input layer, a plurality of hidden layers, and an output layer;
   training the deep learning model using the training sample to obtain a trained deep learning model;
   using the trained deep learning model, recognizing type of a geological feature of an electrical imaging well logging image of a well section to be recognized to obtain a recognition result; and
   performing morphological optimization processing on the recognition result to obtain a feature optimization recognition result;
   wherein the deep learning model is constructed as follows:
   the deep learning model includes a twelve-layer structure comprising: a first layer, a second layer, a third layer, a fourth layer, a fifth layer, a sixth layer, a seventh layer, an eighth layer, a ninth layer, a tenth layer, an eleventh layer, and a twelfth layer;
   a structure of each layer of the twelve-layer structure is as follows:
   the first layer is an input layer;
   the second layer is a hidden layer, including a convolution layer, an activation function layer, a convolution layer, an activation layer, and a pooling layer;
   the third layer is a hidden layer, including a convolution layer, an activation function layer, a convolution layer, an activation layer, and a pooling layer;
   the fourth layer is a hidden layer, including a convolution layer, an activation function layer, a convolution layer, an activation layer, a convolution layer, an activation layer, and a pooling layer;
   the fifth layer is a hidden layer, including a convolution layer, an activation function layer, a convolution layer, an activation layer, a convolution layer, an activation layer, and a pooling layer;
   the sixth layer is a hidden layer, including a convolution layer, an activation function layer, a convolution layer, an activation layer, a convolution layer, an activation layer, and a pooling layer;
   the seventh layer is a hidden layer, including a full convolution layer, an activation function layer, and a Dropooout layer;
   the eighth layer is a hidden layer, including a full convolution layer, an activation function layer, and a Dropooout layer;
   the ninth layer is a hidden layer, including a deconvolution layer, a Crop layer, and an Eltwise layer;
   the tenth layer is a hidden layer, including a deconvolution layer, a Crop layer, and an Eltwise layer;
   the eleventh layer is a hidden layer, including a deconvolution layer and a Crop layer; and
   the twelfth layer is an output layer, including a softmax layer.

2. The method for automatically extracting image features of electrical imaging well logging according to claim 1, wherein pre-processing the historical data of the electrical imaging well logging to generate an electrical imaging well logging image covering a full hole includes:
performing acceleration correction processing and equalization processing on the historical data of the electrical imaging well logging to obtain an original electrical imaging well logging image;
performing resistivity scale processing on the original electrical imaging well logging image to obtain a scale image reflecting resistivity of rocks of borehole wall formation; and
performing full hole image generation processing on the scale image reflecting resistivity of rocks of borehole wall formation, to generate an electrical imaging well logging image covering the full hole.

3. The method for automatically extracting image features of electrical imaging well logging according to claim 2, wherein recognizing the well logging facies of the electrical imaging well logging image of the well section to be recognized using the trained deep learning model includes:
performing acceleration correction processing and equalization processing, resistivity scale processing, and a full hole image generation process on the electrical imaging well logging image of the well section to be recognized, to generate an electrical imaging well logging image covering the full hole that is to be recognized;
performing depth-by-depth window processing on the electrical imaging well logging image covering the full hole that is to be recognized, to obtain a plurality of depth window images; and
inputting the plurality of depth window images into the trained deep learning model to obtain a recognition result.

4. The method for automatically extracting image features of electrical imaging well logging according to claim 1, wherein the method includes the step of:
performing statistics on geological feature development parameters of the recognition result according to the geological feature type; and
evaluating a development degree of a reservoir according to the statistical geological feature development parameters.

5. The method for automatically extracting image features of electrical imaging well logging according to claim 4, wherein the geological feature development parameters include one or more of a surface porosities of development of different geological features, grain diameters of different geological features and number of development of different geological features.

6. A computer device comprising:
a memory,
a processor, and
a computer program stored on the memory and executable on the processor, wherein when executing the computer program, the processor implementing the following:
acquiring historical data of electrical imaging well logging;
pre-processing the historical data of the electrical imaging well logging to generate an electrical imaging well logging image covering a full hole;
recognizing and marking a typical geological feature in the electrical imaging well logging image covering the full hole, obtaining a processed image, and determining the processed image as a training sample according to types of the geological features;
constructing a deep learning model including an input layer, a plurality of hidden layers, and an output layer;
training the deep learning model using the training sample to obtain a trained deep learning model;
using the trained deep learning model, recognizing type of a geological feature of an electrical imaging well logging image of a well section to be recognized to obtain a recognition result; and
performing morphological optimization processing on the recognition result to obtain a feature optimization recognition result;
wherein the deep learning model is constructed as follows:
the deep learning model includes a twelve-layer structure comprising: a first layer, a second layer, a third layer, a fourth layer, a fifth layer, a sixth layer, a seventh layer, an eighth layer, a ninth layer, a tenth layer, an eleventh layer, and a twelfth layer;
a structure of each layer of the twelve-layer structure is as follows:
the first layer is an input layer;
the second layer is a hidden layer, including a convolution layer, an activation function layer, a convolution layer, an activation layer, and a pooling layer;
the third layer is a hidden layer, including a convolution layer, an activation function layer, a convolution layer, an activation layer, and a pooling layer;
the fourth layer is a hidden layer, including a convolution layer, an activation function layer, a convolution layer, an activation layer, a convolution layer, an activation layer, and a pooling layer;
the fifth layer is a hidden layer, including a convolution layer, an activation function layer, a convolution layer, an activation layer, a convolution layer, an activation layer, and a pooling layer;
the sixth layer is a hidden layer, including a convolution layer, an activation function layer, a convolution layer, an activation layer, a convolution layer, an activation layer, and a pooling layer;
the seventh layer is a hidden layer, including a full convolution layer, an activation function layer, and a Dropoout layer;
the eighth layer is a hidden layer, including a full convolution layer, an activation function layer, and a Dropoout layer;
the ninth layer is a hidden layer, including a deconvolution layer, a Crop layer, and an Eltwise layer;
the tenth layer is a hidden layer, including a deconvolution layer, a Crop layer, and an Eltwise layer;
the eleventh layer is a hidden layer, including a deconvolution layer and a Crop layer; and
the twelfth layer is an output layer, including a softmax layer.

7. The computer device according to claim 6, wherein when executing the computer program, the processor implementing the following:
to generate the electrical imaging well logging image covering the full hole, pre-processing the historical data of the electrical imaging well logging by:
performing acceleration correction processing and equalization processing on the historical data of the electrical imaging well logging to obtain an original electrical imaging well logging image;

performing resistivity scale processing on the original electrical imaging well logging image to obtain a scale image reflecting resistivity of rocks of borehole wall formation; and performing full hole image generation processing on the scale image reflecting resistivity of rocks of borehole wall formation, to generate an electrical imaging well logging image covering the full hole.

8. The computer device according to claim 7, wherein when executing the computer program, the processor implementing the following:

recognizing the well logging facies of the electrical imaging well logging image of the well section to be recognized using the trained deep learning model, by:

performing acceleration correction processing and equalization processing, resistivity scale processing, and a full hole image generation process on the electrical imaging well logging image of the well section to be recognized, to generate an electrical imaging well logging image covering the full hole that is to be recognized;

performing depth-by-depth window processing on the electrical imaging well logging image covering the full hole that is to be recognized, to obtain a plurality of depth window images; and inputting the plurality of depth window images into the trained deep learning model to obtain a recognition result.

9. The computer device according to claim 6, wherein when executing the computer program, the processor implementing the following:

performing statistics on geological feature development parameters of the recognition result according to the geological feature type; and evaluating a development degree of a reservoir according to the statistical geological feature development parameters.

10. The computer device according to claim 9, wherein when executing the computer program, the processor implementing the following:

the geological feature development parameters include one or more of a surface porosities of development of different geological features, grain diameters of different geological features and number of development of different geological features.

11. A non-transitory computer-readable medium, wherein the non-transitory computer-readable medium stores a computer program for executing the following method of:

acquiring historical data of electrical imaging well logging;

pre-processing the historical data of the electrical imaging well logging to generate an electrical imaging well logging image covering a full hole;

recognizing and marking a typical geological feature in the electrical imaging well logging image covering the full hole, obtaining a processed image, and determining the processed image as a training sample according to types of the geological features;

constructing a deep learning model including an input layer, a plurality of hidden layers, and an output layer;

training the deep learning model using the training sample to obtain a trained deep learning model;

using the trained deep learning model, recognizing type of a geological feature of an electrical imaging well logging image of a well section to be recognized to obtain a recognition result; and performing morphological optimization processing on the recognition result to obtain a feature optimization recognition result;

wherein the deep learning model is constructed as follows:

the deep learning model includes a twelve-layer structure comprising: a first layer, a second layer, a third layer, a fourth layer, a fifth layer, a sixth layer, a seventh layer, an eighth layer, a ninth layer, a tenth layer, an eleventh layer, and a twelfth layer;

a structure of each layer of the twelve-layer structure is as follows:

the first layer is an input layer;

the second layer is a hidden layer, including a convolution layer, an activation function layer, a convolution layer, an activation layer, and a pooling layer;

the third layer is a hidden layer, including a convolution layer, an activation function layer, a convolution layer, an activation layer, and a pooling layer;

the fourth layer is a hidden layer, including a convolution layer, an activation function layer, a convolution layer, an activation layer, a convolution layer, an activation layer, and a pooling layer;

the fifth layer is a hidden layer, including a convolution layer, an activation function layer, a convolution layer, an activation layer, a convolution layer, an activation layer, and a pooling layer;

the sixth layer is a hidden layer, including a convolution layer, an activation function layer, a convolution layer, an activation layer, a convolution layer, an activation layer, and a pooling layer;

the seventh layer is a hidden layer, including a full convolution layer, an activation function layer, and a Dropoout layer;

the eighth layer is a hidden layer, including a full convolution layer, an activation function layer, and a Dropoout layer;

the ninth layer is a hidden layer, including a deconvolution layer, a Crop layer, and an Eltwise layer;

the tenth layer is a hidden layer, including a deconvolution layer, a Crop layer, and an Eltwise layer;

the eleventh layer is a hidden layer, including a deconvolution layer and a Crop layer; and the twelfth layer is an output layer, including a softmax layer.

12. The non-transitory computer-readable medium according to claim 11, wherein the computer program is used for executing the following:

to generate the electrical imaging well logging image covering the full hole, pre-processing the historical data of the electrical imaging well logging by:

performing acceleration correction processing and equalization processing on the historical data of the electrical imaging well logging to obtain an original electrical imaging well logging image;

performing resistivity scale processing on the original electrical imaging well logging image to obtain a scale image reflecting resistivity of rocks of borehole wall formation; and performing full hole image generation processing on the scale image reflecting resistivity of rocks of borehole wall formation, to generate an electrical imaging well logging image covering the full hole.

13. The non-transitory computer-readable medium according to claim 12, wherein the computer program is used for executing the following: recognizing the well logging facies of the electrical imaging well logging image of the well section to be recognized using the trained deep learning model, by: performing acceleration correction processing and equalization processing, resistivity scale processing, and a full hole image generation process on the electrical imaging well logging image of the well section to be recognized, to generate an electrical imaging well logging image covering the full hole that is to be recognized; performing depth-by-depth window processing on the electrical imaging well logging image covering the full hole that is to be recognized, to obtain a plurality of depth window images; and inputting the plurality of depth window images into the trained deep learning model to obtain a recognition result.

14. The non-transitory computer-readable medium according to claim 11, wherein the computer program is used for executing the following:
   performing statistics on geological feature development parameters of the recognition result according to the geological feature type; and
   evaluating a development degree of a reservoir according to the statistical geological feature development parameters.

15. The non-transitory computer-readable medium according to claim 14, wherein the computer program is used for executing the following:
   the geological feature development parameters include one or more of a surface porosities of development of different geological features, grain diameters of different geological features and number of development of different geological features.

\* \* \* \* \*